United States Patent [19]

Kim et al.

[11] Patent Number: 5,763,066
[45] Date of Patent: Jun. 9, 1998

[54] NONLINEAR OPTICAL INCLUSION COMPLEXES

[75] Inventors: Oh-Kil Kim, Burke, Va.; Ling-Siu Choi, Bethesda, Md.; Heyi Zhang; Xue Hua He, both of Baltimore, Md.; Yan Huh Shih, Ellicott City, Md.

[73] Assignee: The United States of America as represented by the Secretary of the Navy, Washington, D.C.

[21] Appl. No.: 490,413

[22] Filed: Jun. 14, 1995

[51] Int. Cl.$^6$ .................. B05D 7/00; B32B 00/00; G02B 6/00

[52] U.S. Cl. .................. 428/221; 252/582; 385/122; 428/332; 428/409; 428/411.1

[58] Field of Search .................. 428/332, 411.1, 428/221, 409, 426, 457, 910, 913; 307/401; 252/582; 385/122

[56] References Cited

U.S. PATENT DOCUMENTS

| | | | |
|---|---|---|---|
| 4,199,698 | 4/1980 | Bethea et al. | 307/425 |
| 4,818,898 | 4/1989 | Anderson et al. | 307/427 |
| 4,929,392 | 5/1990 | Trend | 252/582 |
| 4,939,388 | 7/1990 | Eaton et al. | 307/427 |
| 4,941,996 | 7/1990 | Trend et al. | 252/584 |
| 4,962,979 | 10/1990 | Anderson et al. | 350/1.1 |

*Primary Examiner*—H. Thi Le
*Attorney, Agent, or Firm*—Thomas E. McDonnell; George Kap

[57] ABSTRACT

Inclusion complexes have an organic guest molecule dye with an electron donor portion, an electron acceptor portion and a hydrophobic tail portion disposed within an organic carbohydrate host molecule. The dye in the inclusion complexes has improved thermal stability compared to itself. The complexes can be used to form a solution-cast film disposed on a substrate wherein the film thickness is up to about 20 microns and the film is made of anisotropically self-aligned (self-poled) inclusion complexes.

21 Claims, 2 Drawing Sheets

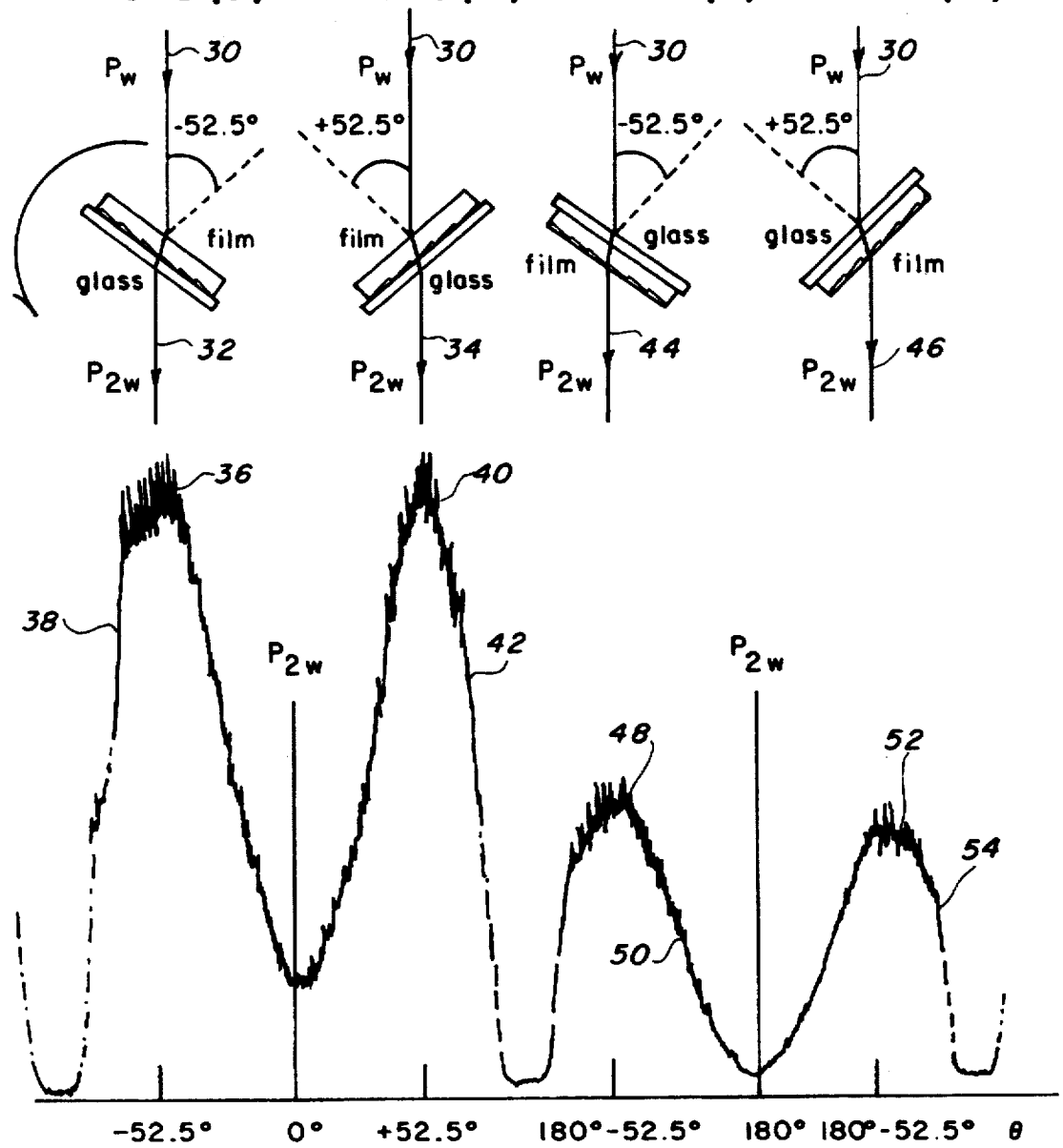

NONLINEAR OPTICAL INCLUSION COMPLEXES

FIELD OF THE INVENTION

This invention pertains to the field of inclusion complexes and anisotropically self-oriented solution-cast substrates.

BACKGROUND OF INVENTION

For the development of efficient second order nonlinear optical materials, it is necessary for such materials to have a large nonlinear susceptibility, fast response time, thermal or temporal stability and ease of processing. The second order nonlinear susceptibility is reflected in $\chi^{(2)}$, which is a measure of polarization of the material. The poling, however, is essential to produce nonlinearity in organic nonlinear optical materials. Generally, after poling, some dipole moments change directions.

Some improvements have been made in thermal/temporal stability of such materials. For instance, the matrix and/or the chromophore of such materials have been crosslinked to obtain thermal stability. However, there still remain problems such as inhomogeneity of the chromophore distribution and scattering resulting from poor quality control of the crosslinked materials. Another significant improvement is to use high glass transition temperature ($T_g$) material as a matrix since thermal relaxation is enhanced at higher temperatures. Since poling is carried out at around $T_g$, poling at high temperatures imparts to the dyes problems such as bleaching, decomposition, or loss of dipolar alignment, unless dyes are selected with high decomposition temperatures. Another related problem is a plasticizing effect of the chromophores which lowers Tg of the matrix with increasing dye concentration.

SUMMARY OF INVENTION

An object of this invention is second order nonlinear optical inclusion complexes of a guest disposed within a host and an optically transparent film of the complexes on an optically transparent substrate.

Another object of this invention is inclusion complexes of a guest organic dye disposed within a host, which dye in the complexes has greater thermal stability than the dye by itself and the complexes do not have $T_g$.

Another object of this invention is an anisotropically self-aligned film disposed on a polar substrate or a nonpolar substrate surface-treated to provide a polar surface, the film comprising inclusion complexes of an organic nonlinear guest disposed within an organic carbohydrate host wherein dipoles of the complexes interact with dipoles on the substrate.

These and other objects of this invention are attained by inclusion complexes of a guest disposed within a host, in which complexes are prepared by dissolving the guest and the host in a solvent to form a solution, adding sufficient water to the solution to form the inclusion complexes, and removing the solvent and water to from the solid-state complexes wherein the guest dye has improved thermal/temporal stability. The solid film disposed on a substrate is made by preparing an aqueous solution of the complexes, depositing the solution on a substrate, and removing water from the solution to form the solid film with optical clarity which is composed of anisotropically self-aligned inclusion complexes.

BRIEF DESCRIPTION OF DRAWINGS

FIG. 3(a), (b), (c) and (d) represent test results of projecting light at the inclusion complex film on a substrate initially through the film and then through the substrate from two different angles as confirmation of the self-aligning property of the inclusion complexes.

DETAILED DESCRIPTION OF INVENTION

Figure 1:
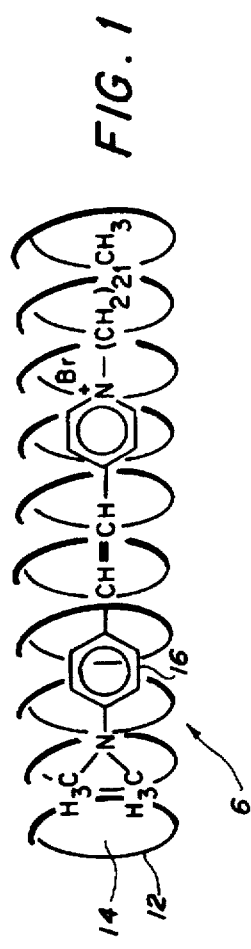
FIG. 1 is a schematic illustration of an inclusion complex of he amylose host with a photoreactive hemicyanin dye disposed within the cavity of the amylose host.

This invention pertains to water-soluble inclusion complexes which have second order nonlinearity. These complexes are composed of an organic guest disposed within an organic carbohydrate host wherein the guest has improved thermal stability. This invention also pertains to films in solid form of the complexes disposed on a substrate, with the complexes self-aligned directionally in anisotropic orientation. H-bonding is believed to be responsible for the interacting forces between the inclusion complexes, resulting in the thermally stable anisotropic alignment in the solid film.

The host of the inclusion complexes is an organic carbohydrate defined as any polyhydroxy aldehyde, any polyhydroxy ketone, or any compound that can be hydrolyzed thereto. The host is a helical molecule with a cavity therein within which is positioned the guest. In this way, the host protects the guest by shielding the guest from whatever influence is imparted onto the inclusion complex from outside, be it in the form of thermal energy, radiation or whatever. For the purposes herein, suitable host materials include amylose, amylopectin and pullulan, preferably amylose. These host materials are derivatives of starch and are characterized by being different carbohydrates of high molecular weight.

Amylose is a linear chain polysaccharide consisting of L-1,4-glucosidic units. Solubility of amylose increases with decreasing molecular weight, however, for purposes herein, even low molecular weight amylose is considered to have low water solubility. Amylose has a generally helical shape and the diameter of its cavity is in the range of 4–7 angstroms in solid state. Inside the cavity, amylose is hydrophobic but on the outside, it is hydrophilic.

Molecular weight of the host is in the range of 1,000 to 500,000 and is typically in the range of 3,000 to 200,000. The preferred amylose host is a low molecular weight material having molecular weight in the range of 1,000 to 10,000 and especially 3,000 to 6,000. The size of the host is generally selected and coordinated with the size of the guest so that generally, one molecule of the guest is disposed within one molecule of the host.

The guest is an organic material characterized by the presence of a benzene ring A connected to B by a connecting unit D, as illustrated by formula (I) below:

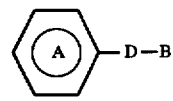

where B is selected from the following:

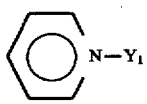

(a)

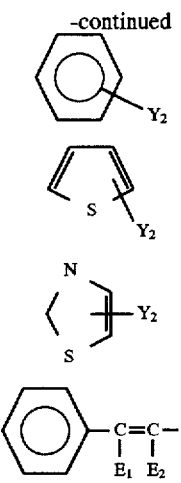

where $Y_1$ is selected from the group consisting of unsubstituted and substituted alkyl radicals containing at least 8 carbon atoms, more typically 12–30; $Y_2$ is selected from the group consisting of an aldehyde group, a cyano group, a nitro group, and an alkyl sulfinate group containing 2 to 50 carbon atoms in the alkyl radical; $E_1$ and $E_2$ are individually selected from the group consisting of hydrogen and cyano group; and D is a connecting unit containing unsaturation. In the case where B contains the pyridinyl ring, the connecting unit is selected from the following:

(a) $(C=C)_z$,
(b) $(N=N)_z$, and
(c) $(C=N)_z$ where z is 1 to 3.

In a preferred embodiment, the guest is a photoreactive dye characterized by the following structure (II):

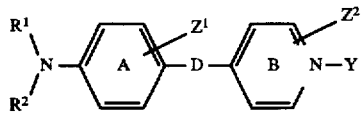

where D is as described above; $R^1$ and $R^2$ may each be an alkyl group containing 1–30 carbon atoms, more typically 1–15 carbon atoms and may be same or different; $Z^1$ and $Z^2$ each may be one or more individually selected alkyl groups containing 0–30, more typically 0–10 carbon atoms; and Y is selected from the group consisting of substituted and unsubstituted alkyl groups containing at least 8 carbon atoms, and more typically unsubstituted alkyl groups containing 12–30 carbon atoms. The portion of the dye containing the benzene ring is an electron donor portion whereas the portion of the dye containing the pyridinyl ring is the electron acceptor portion.

Especially preferred guest dye is a dye having the following structure (III):

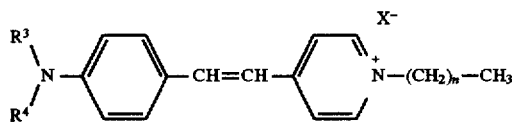

where $R^3$ and $R^4$ may each be an alkyl group containing 1–6, more typically 1–3 carbon atoms and may be same or different; X is a halogen atom, typically bromine, chlorine or an organic anion; and n is a number from 7–50, more typically 11 to 29. The above dye (III) with $R^3$ and $R^4$ both methyl and X bromine is 4[4-(dimethylamino)styryl]-1-alkylpyridinium bromide or DASP-$C_n$, where n denotes the number of carbon atoms in the alkyl tail group.

The 1:1 inclusion complexes of amylose host containing within its cavity a hemicyanin dye is a solid that is pinkish red in color, is a second order nonlinear material that is characterized by a $\chi^{(2)}$ value on the order of $10^{-9}$ esu, preferably in the range of $1-4\times10^{-9}$ esu, and a temporal stability at room temperature that appears to be indefinite.

The inclusion complexes can be prepared in a way to impart thereto both thermal stability and the self-alignment feature. The preparation procedure involves dissolving the host and the guest in a solvent. It is typical practice to use a small excess of the guest. It is preferred to dissolve the host and the guest in the same solvent, however, it is possible to dissolve the host and the guest in separate or different solvents to form two solutions and then to mix the two solutions to form one solution, assuming the two solvents are readily miscible in each other.

The size of the host and guest should be selected so that one will fit within the other in a stoichiometric ratio of about one guest molecule within one host molecule, or about 1:1. The reason for this is that there is only a 50/50 chance that if two molecules of a guest are introduced into a host molecule, their dipole moments will be oriented in the opposite direction. For this and other reasons, the lower molecular weight hosts are typically used on the basis of their solubility after complexation.

The guest is also selected not only with respect to its size relative to the host but also with respect to its hydrophobicity. In a guest, hydrophobicity is typically determined by the alkyl substituents in the headgroup, its tail or both. Hydrophobicity of the guest should be sufficient to drive the guest molecules within the host molecules. It has been empirically determined that sufficient hydrophobicity is present in guest molecules which have at least about 10 substituent carbon atoms in the headgroup and the tail of a guest molecule or at least about 8 substituent carbon atoms in the tail.

Typical solvents which can serve as a solvent for both the host and the guest include dimethyl sulfoxide, dimethyl formamide and N-methyl pyrrolidone. Any other polar organic solvent can be used which solubilizes the host, the guest or both.

After the host and the guest are solubilized in a solvent and mixed, water is continuously added to the solution with mixing whereby the inclusion complexes are formed. Unless a requisite amount of water is present, complete inclusion complexation will not occur. Formation of the inclusion complexes takes place in a medium containing the solvent and water. In absence of a host, the guest in the medium of water and solvent will aggregate because it is hydrophobic. Force of aggregation is generally less than the force of attraction into the solvent cavity.

Inclusion complexation in a medium is governed by hydrophobic and hydrophilic forces of the components present in the medium. Outside of the host molecule is generally hydrophilic whereas inside the host cavity is hydrophobic. Since the guest is typically hydrophobic, it is seeking to escape from water as water is added to the medium. The hydrophobicity of the guest and the hydrophobicity of the interior of the host drive the guest into the hydrophobic cavity of the host. If insufficient water is added to the medium, then not many of the guest molecules will be forced into cavity of a host molecule and therefore, not many inclusion complexes will be formed. It is only when sufficient water is present in the medium that complete inclusion complexation takes place.

Any amount of water can be present in a medium exceeding the requisite amount without compromising or in any way dissociating the inclusion complexes. Once the inclusion complexes are formed, no amount of water added to the medium will affect the integrity of the inclusion complexes. This is not the case with the solvent, however. Once the inclusion complexes are formed in the medium, a certain volume percent of the solvent should not be exceeded. If that volume percent of the solvent is exceeded, the inclusion complexes will start dissociating. In a medium consisting of water and a solvent, amount of the solvent in the medium should be in the range of 80–10 volume percent, preferably 60–20 volume percent.

The progress of inclusion complexation can be followed by spectroscopically testing the medium from time to time for the presence of components in the medium. Knowing the spectroscopic signatures of the host or hosts, the guest or guests, and the inclusion complexes in the medium, one can follow the reaction by analyzing the reaction medium and determining the presence and amount of any one or all of the components in the medium. The reaction during which the inclusion complexes are formed is typically instantaneous.

After the inclusion complexes are formed in the liquid medium, the medium is separated and the inclusion complexes are recovered in a solid form. Separation of the medium from the inclusion complexes is accomplished by removing components of the medium, which are the liquid solvent and water. The solvent can be removed by dialysis and water can be removed by freeze-drying.

Removal of the solvent by dialysis from the reaction medium is made in a way that prevents solvent concentration in the medium from exceeding the limit. The reaction medium contains solvent, water, inclusion complexes, and possibly other components, such as unreacted reagents and precipitated matter. Dialysis can take up to several days or a week. This is done by placing a receptacle containing the reaction medium into deionized water and changing the deionized water 2 to 3 times a day. The dialysis receptacle is typically made from material with a molecular weight cut-off on the basis of molecular weight which allows the smaller solvent molecules to pass from the reaction medium into the deionized water but prevents larger molecules of the inclusion complexes to escape. Other larger molecules, in addition to the inclusion complexes, are retained in the dialysis receptacle. The dialysis receptacles are typically made from semipermeable synthetic or natural membranes. The dialysis rate can be accelerated by changing the deionized water more often or by other means known to those skilled in the art. Removal of the solvent can be followed by the sense of smell, since solvents have a distinctive odor. This can also be done by uv-vis spectroscopy. Lack of the solvent odor in the reaction medium typically indicates removal of all or most of the solvent.

Since the inclusion complexes are typically soluble in water, they remain in the aqueous solution after removal of the solvent. To separate water from the inclusion complexes after solvent removal, the aqueous solution of the inclusion complexes is subjected to freeze drying. Freeze drying involves freezing the aqueous solution and then subliming the the ice crystals to a container maintained under a vacuum. Water is removed in the container and what remains is the inclusion complexes typically in solid form. Precipitated and other matter can be removed by filtering before the freeze-drying operation.

The inclusion complexes can be used to provide a solid film on a substrate, which film is a second order nonlinear optical material. The inclusion complexes forming the film self-align in anisotropic polar orientation nearly perpendicularly to the substrate with the electron donor portions positioned against the substrate surface.

An optically transparent film is provided on a substrate. Thickness of the film is up to about 20 microns, preferably 1–12 microns. The inclusion complexes on the substrate self-align in anisotropic orientation almost perpendicularly to the substrate. If the film is too thick, anisotropic alignment will not be perfectly achieved and if it is too thin, it will lack physical integrity. The driving force for the self-alignment and concomitant dipolar orientation is unclear but it is assumed to be due to a selective interface interaction between the headgroup dipole of the dye within the complexes and the polar substrate surface.

The substrate contemplated herein has a polar surface to facilitate anisotropic self-alignment of the inclusion complexes in the film disposed on the substrate. The substrate can be made of any material which provides a polar surface. Alternatively, a polar surface can be provided on a nonpolar substrate. Suitable substrates can be glass, metal, plastic and the like, preferably glass. When the substrate is glass, the glass surface can be considered a weak acid with a plurality of hydroxyl groups which interact with the electron donor portion of the dye headgroup, which can be considered to be a strong base, to facilitate anisotropic self-alignment of the inclusion complexes on the glass substrate. Anisotropic self-alignment obviates poling.

For purposes herein, the dimensions of the substrate can be varied to meet the requirements of a situation. Typically, however, dimensions of a substrate are in the range of 5"×5" with a thickness of up to ½".

The solid film can be provided on the substrate in any manner desired, including casting. The casting procedure involves dissolving the inclusion complexes in water to form an aqueous solution thereof, applying a small amount of the solution onto a substrate, evenly spreading the solution on the substrate, and drying the solution to drive-off water in order to deposit the film in solid form on the substrate. Thickness of the solid film on the substrate can be controlled by varying concentration of the aqueous solution and thickness of the aqueous liquid film.

The anisotropic self-alignment nature of the inclusion complexes disposed on a substrate can be confirmed by analyzing the second harmonic signals generated when light is projected on film disposed on a substrate. In this procedure, light is projected onto the film composed of the inclusion complexes and disposed on a substrate initially from the air-film interface side and then from the air-substrate interface side while rotating the substrate so that the light is projected through an incident angle of 0°–180°. Intensity of the second harmonic signals emanating from the opposite side will vary with the incident angle and have a peak. The peak of the second harmonic signals emanating from the opposite side will be greater where incidence of light is on the film rather than on the substrate, indicating better anisotropic orientation of the inclusion complexes in the film at the film-substrate interface rather than at the air-film interface.

The invention having been generally described, the following examples are given as particular embodiments of the invention to demonstrate the practice and advantages thereof. It is understood that the examples are given by way of illustration and are not intended to limit in any manner the specification or any claims that follow.

EXAMPLE 1

This example demonstrates preparation of inclusion complexes wherein the host was amylose of 4100 molecular weight and the guest was the hemicyanine dye 4[4(dimethyl amino)styryl-1-alkylpyridinum bromide wherein the alkyl tail contained 22 carbon atoms (DASP-$C_{22}$). The host amylose has a decomposition temperature that starts at about 250° C. and the guest dye starts decomposing at about 240° C. The dye had the following structural formula (IV):

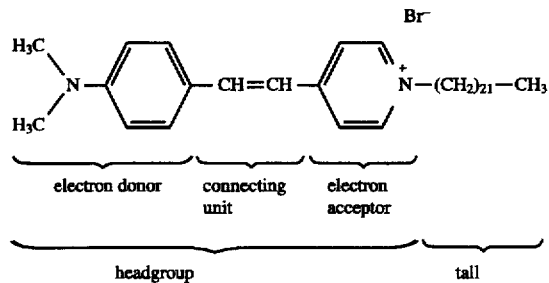

The guest dye in an amount of 0.1064 gram ($1.73 \times 10^{-4}$ moles) was dissolved in 250 milliliters of dimethylsulfoxide solvent and 1.15 g ($2.80 \times 10^{-4}$ moles) of amylose was added thereto and dissolved therein with mixing. When the solution became homogeneous in a few minutes, deionized water was added to the solution to make 1 liter of the reaction medium. Upon the addition of water, the inclusion complexes formed instantaneously.

To obtain the water-soluble inclusion complexes in a solid form, the solvent and water were removed. The solvent was removed from the reaction medium by transferring the reaction medium into a container made of a semipermeable regenerated cellulose membrane and placing the container into deionized water for a period of about one week. The container membrane was commercially available and had molecular weight cut-off of 3500, meaning that anything of molecular weight below 3500 could leave the container but anything of molecular weight above 3500 remained in the container. The purpose here was to remove the organic solvent and retain the inclusion complexes.

After about one week in the deionized water, which was changed twice daily, the dialysis procedure was completed when it was determined that the organic solvent was removed by confirming the absence of the solvent odor and uv-vis spectra. An aqueous solution of the inclusion complexes remained in the container.

The water from the aqueous solution was removed by freeze-drying. The aqueous solution was transferred from the container to a glass receptacle. The aqueous solution in the receptacle was frozen in dry ice and the open end of the receptacle was then connected to an apparatus wherein its interior was maintained at −40° C. under a vacuum of about $10^{-4}$ torr. Removal of water by the freeze drying operation described above took about two days whereupon red inclusion complexes were obtained in solid state in the form of cotton candy.

The $\chi^{(2)}$ value for the solid film of these inclusion complexes 10, one of which is illustrated in FIG. 1, was $4 \times 10^{-9}$ esu. The inclusion complex of FIG. 1 is composed of host amylose 12 with cavity 14 within which is disposed guest dye 16. The $\chi^{(2)}$ value for these inclusion complexes remained unchanged for 1200 hours in air at room temperature, at which time the test was discontinued. Likewise, the $\chi^{(2)}$ value remained unchanged when the sample was kept in air at 90° C. for 100 hours, at which time the test was discontinued.

Figure 2:
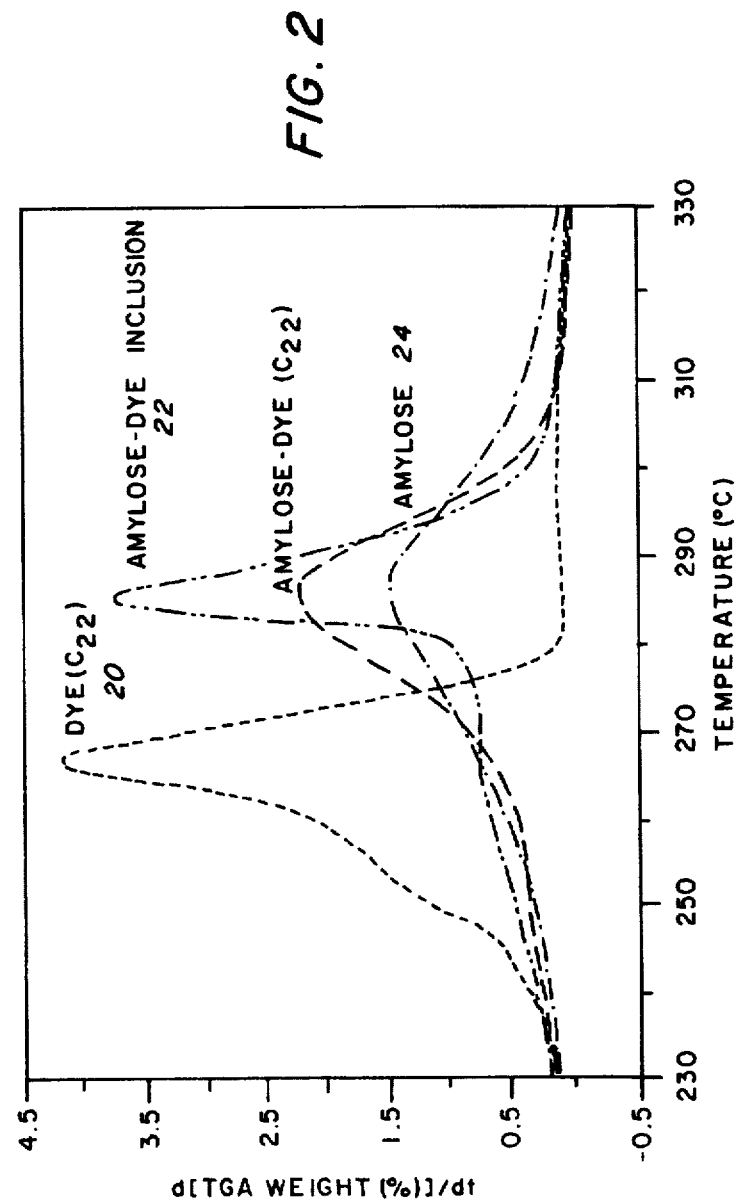
FIG. 2 is a plot which illustrates the improved thermal stability of the hemicyanin dye in the inclusion complex.

FIG. 2 shows plots of temperature against percent weight loss per degree Centigrade at a heating rate of 10 degrees per minute for the guest dye DASP-$C_{22}$ 20 by itself, the inclusion complex 22, host amylose 24, and as a 1:1 physical mixture of the host amylose and the guest dye DASP-$C_{22}$. FIG. 2 is used to interpret the thermal stability of the inclusion complex by comparing the maximum decomposition temperature of the dye by itself at about 265° C. to the maximum decomposition temperature of the inclusion complex at about 285° C. On the basis of this comparison, it is reasonable to conclude that thermal stability of the dye has been improved or raised by about 20° C. by encapsulating the dye within amylose. Amylose acts as a shield for the dye to improve not only thermal stability but also oxidation stability of the dye.

EXAMPLE 2

This example demonstrates preparation of a dry film of the inclusion complexes described in Ex. 1 on a glass substrate.

The inclusion complexes of guest dye DASP-$C_{22}$ in amylose of 4100 molecular weight, prepared as described in Ex. 1, above, in amount of 0.5 g were dissolved in 5 ml of deionized water to form an aqueous solution thereof. Drops of the aqueous solution were deposited on about ¾"×¾" surface of a glass substrate which was about 0.01" in thickness. The aqueous solution was cast on the substrate by manipulating the substrate so that the solution wetted the top surface of the substrate. On drying in air for about 6 hours, an optically transparent film of the inclusion complexes was deposited on the substrate at a thickness of 6 microns. The inclusion complexes in the film deposited on the substrate were anisotropically self-aligned (no need of poling). The complexes were aligned vertically with the electron donor portion thereof attracted to the substrate.

The $\chi^{(2)}$ value for the film was $2 \times 10^{-9}$ esu.

The second harmonic generated (SHG) signal from the light that was projected onto the film was used to test anisotropic self-alignment of the inclusion complexes in the film deposited on the substrate. If the inclusion complexes were not anisotropically oriented, there would be no SHG signal. Light 30 was projected at the film in FIG. 3(a) and (b) and at the substrate in FIG. 3(c) and (d) through various incident angles. As shown in FIG. 3(a) and (b), the maximum intensity of the SHG signals 32, 34 was obtained at incident beam angles of −52.5°, and +52.5°. The peak intensity at angle −52.5° is indicated by point 36 of plot 38 and the peak intensity at angle +52.5° is indicated by point 40 of plot 42. The high intensity of the signals is an indication of a high order of anisotropic alignment of the inclusion complexes in the film at the interface of substrate and film and the fact that intensity of the signal is about equal is an indication that alignment is essentially vertical or normal to the substrate surface. When the light was projected at the substrate, as shown in FIG. 3(c) and (d), the intensity of the SHG signals 44, 46 was much less than in FIG. 3(a) and (b). In FIG. 3(c), the peak intensity at angle −52.5° is shown by point 48 of plot 50 and the peak intensity at angle +52.5° is illustrated by point 52 of plot 54. The diminished intensity in FIG. 3(c) and (d) is an indication of a lesser degree of anisotropic orientation of the inclusion complexes in the film at the air-film interface, however, the fact that intensities in FIG. 3(c) and (d) are about equal, indicates that alignment is essentially vertical.

The diminished intensity of the SHG signals in FIG. 3(c) and (d) is consonant with the fact that film thickness was 6 microns and its coherent length was 2.12 microns. It is expected that anisotropic polar orientation of the inclusion complexes would be greater at the film-substrate interface than at the air-film interface.

Many modifications and variations of the present invention are possible in light of the above teachings. It is, therefore, to be understood that within the scope of the appended claims, the invention may be practiced otherwise than as specifically described.

What is claimed is:

1. A composition of matter comprising water-soluble inclusion complexes consisting of an organic quest disposed within an organic carbohydrate host where the guest contains the following structure:

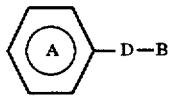

where B is selected from the following:

(a) 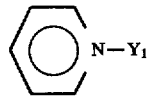

(b) 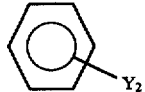

(c) 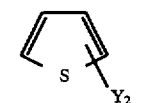

(d) 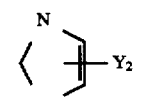

(e) 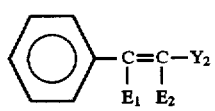

where $Y_1$ is a substituted or unsubstituted alkyl radical containing at least 8 carbon atoms; $Y_2$ is selected from the group consisting of aldehyde groups, cyano groups, nitro groups, and alkyl sulfinate groups containing 2 to 50 carbon atoms in the alkyl radical; $E_1$ and $E_2$ are individually selected from the group consisting of hydrogen and cyano groups; and D is an unsaturated connecting unit.

2. The composition of claim 1 where the guest contains the following structure:

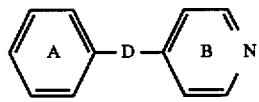

where D is selected from the group consisting of:
a) $(C=C)_z$,
b) $(N=N)_z$, and
c) $(C=N)_z$
where z is 1 to 3.

3. The composition of claim 1 wherein the guest is a dye by having an electron donor portion and electron acceptor portion and wherein the guest dye contains the following structure:

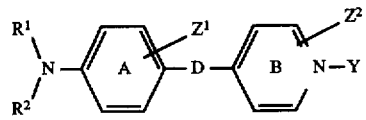

where D is the connecting unit selected from the group consisting of (C=C) groups; $R^1$ and $R^2$ each is an alkyl group containing 1-30 carbon atoms; $Z^1$ and $Z^2$ each are one or more groups selected from the group consisting of hydrogen and alkyl radicals of 1-30 carbon atoms; and Y is selected from the group consisting of alkyl radicals containing at least 8 carbon atoms.

4. The composition of claim 3 where $R^1$ and $R^2$ each is an alkyl group containing 1-15 carbon atoms; $Z^1$ and $Z^2$ each are one or more groups selected from the group consisting of hydrogen and alkyl radicals of 1-10 carbon atoms; and Y is selected from the group consisting of alkyl radicals containing 12-30 carbon atoms.

5. The composition of claim 1 where the guest has the following structure:

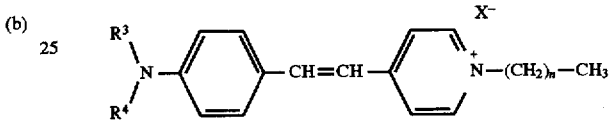

where $R^3$ and $R^4$ each is an alkyl group of 1-6 carbon atoms; X is selected from the group consisting of halogens and organic anions; n is a number from 7 to 50; and the host is selected from the group consisting of amylose, amylopectin, pullulan, and mixtures thereof.

6. The composition of claim 5 where $R^3$ and $R^4$ each is an alkyl group containing 1-3 carbon atoms; X is selected from the group consisting of chlorine and bromine; n is a number from 11 to 29; and molecular weight of the host is in the range of 1,000 to 500,000.

7. The composition of claim 6 where $R^3$ and $R^4$ are same; and X is bromine; and molecular weight of the host is in the range of 3,000 to 200,000.

8. The composition of claim 7 where the host is amylose and the stoichiometric ratio of the guest to the host is one molecule of the guest in one molecule of the host.

9. The composition of claim 8 where molecular weight of the amylose host is in the range of 1,000 to 10,000 and the guest has improved thermal stability compared to the guest by itself, as evidenced by maximum weight loss of the guest itself of about 3.85 units at 265° C. and the maximum weight loss of the inclusion complexes of about 3.53 units at 285° C.

10. The composition of claim 9 where thermal stability improvement is about 20° C.; the inclusion complexes have $\chi^{(2)}$ value on the order of $10^{-9}$ esu; and the $\chi^{(2)}$ value remains essentially unchanged for at least 1,200 hours in air at room temperature.

11. The composition of claim 10 wherein the inclusion complexes in solid state are pinkish red in color and are soluble in water.

12. An article comprising a substrate and a film thereon, the film comprising water-soluble inclusion complexes having second order nonlinearity consisting of an organic guest disposed within an organic host, the inclusion complexes being anisotropically self-aligned on the substrate where the guest comprises the following structure:

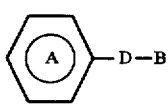

where B is selected from the following:

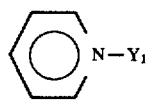  (a)

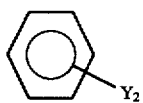  (b)

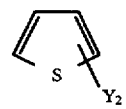  (c)

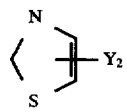  (d)

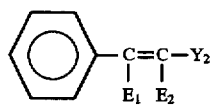  (e)

where $Y_1$ is selected from the group consisting of unsubstituted and substituted alkyl radicals comprising at least 8 carbon atoms; $Y_2$ is selected from the group consisting of aldehyde groups, cyano groups, nitro groups, and alkyl sulfinate groups comprising 2 to 50 carbon atoms in the alkyl radical; $E_1$ and $E_2$ are individually selected from hydrogen and cyano groups; and D is an unsaturated connecting unit.

13. The article of claim 12 where the guest contains the following structure:

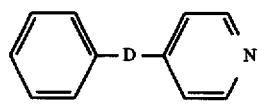

where D is the connecting unit selected from the group consisting of:
a) $(C=C)_z$,
b) $(N=N)_z$, and
c) $(C=N)_z$
where z is 1 to 3.

14. The article of claim 12 where the guest is a dye and where the guest dye has an electron donor portion and an electron acceptor portion disposed within the host and where the guest dye contains the following structure:

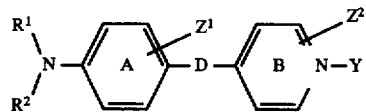

where D is selected from the group consisting of $(C=C)_z$ groups and z is 1 to 3; $R^1$ and $R^2$ each is an alkyl group containing 1–30 carbon atoms; $Z^1$ and $Z^3$ each are one or more groups individually selected from the group consisting of hydrogen and alkyl radicals of 1–30 carbon atoms; and Y is selected from the group consisting of alkyl radicals containing at least 8 carbon atoms.

15. The article of claim 14 where $R^1$ and $R^2$ each is an alkyl group containing 1–15 carbon atoms; $Z^1$ and $Z^2$ each are one or more groups selected from the group consisting of hydrogen and alkyl radicals of 1–10 carbon atoms; and Y is selected from the group consisting of alkyl radicals containing 12–30 carbon atoms.

16. The article of claim 12 and wherein the guest has the following structure:

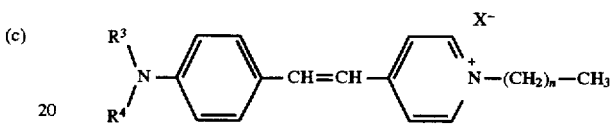

where $R^3$ and $R^4$ each is an alkyl group of 1–6 carbon atoms; X is selected from the group consisting of halogens and organic anions; n is a number from 7 to 50; and the host is selected from the group consisting of amylose, amylopectin, pullulan, and mixtures thereof.

17. The article of claim 16 where thickness of the film is up to about 20 microns; and where $R^3$ and $R^4$ each is an alkyl group containing 1–3 carbon atoms; X is selected from the group consisting of chorine and bromine; n is a number from 11 to 29; and molecular weight of the host is in the range of 1,000 to 500,000.

18. The article of claim 17 where the substrate has a polar surface and is selected from the group consisting of glass, metals, plastics, and mixtures thereof; the substrate has thickness of up to ½"; $R^3$ and $R^4$ are same; X is bromine; and molecular weight of the host is in the range of 3,000 to 200,000.

19. The article of claim 18 where thickness of the film is in the range of 0.1–15 microns; each guest has an electron donor portion and an electron acceptor portion; the inclusion complexes are aligned essentially vertically with the quest electron donor portions against the substrate; the host is amylose; and the stoichiometric ratio of the guest to the host is one molecule of the guest in one molecule of the host.

20. The article of claim 19 where molecular weight of the amylose host is in the range of 1,000 to 10,000; and the guest is an organic, photoreactive dye which has improved thermal stability compared to itself, as evidence by maximum weight loss of the dye itself and the maximum weight loss of the inclusion complexes.

21. The article of claim 20 where thermal stability improvement is about 20° C.; the inclusion complexes have $\chi^{(2)}$ value on the order of $10^{-9}$ esu, and the $\chi^{(2)}$ value remains essentially unchanged for at least 1,200 hours in air at room temperature.

* * * * *